(No Model.)

G. W. SYPHER.
ROTARY STEAM VALVE.

No. 321,156. Patented June 30, 1885.

WITNESSES:
Donn Twitchell
C. Sedgwick

INVENTOR:
G. W. Sypher
BY Munn & Co
ATTORNEYS.

UNITED STATES PATENT OFFICE.

GEORGE W. SYPHER, OF SENECA, KANSAS.

ROTARY STEAM-VALVE.

SPECIFICATION forming part of Letters Patent No. 321,156, dated June 30, 1885.

Application filed January 6, 1885. (No model.)

*To all whom it may concern:*

Be it known that I, GEORGE W. SYPHER, of Seneca, in the county of Nemaha and State of Kansas, have invented a new and Improved Rotary Steam-Valve, of which the following is a full, clear, and exact description.

The object of my invention is to provide a balanced rotary valve that can be readily adjusted to compensate for wear.

The invention consists of the construction, combination, and disposition of parts, substantially as hereinafter fully set forth and claimed.

Reference is to be had to the accompanying drawings, forming a part of this specification, in which similar letters of reference indicate corresponding parts in both the figures.

Figure 1:
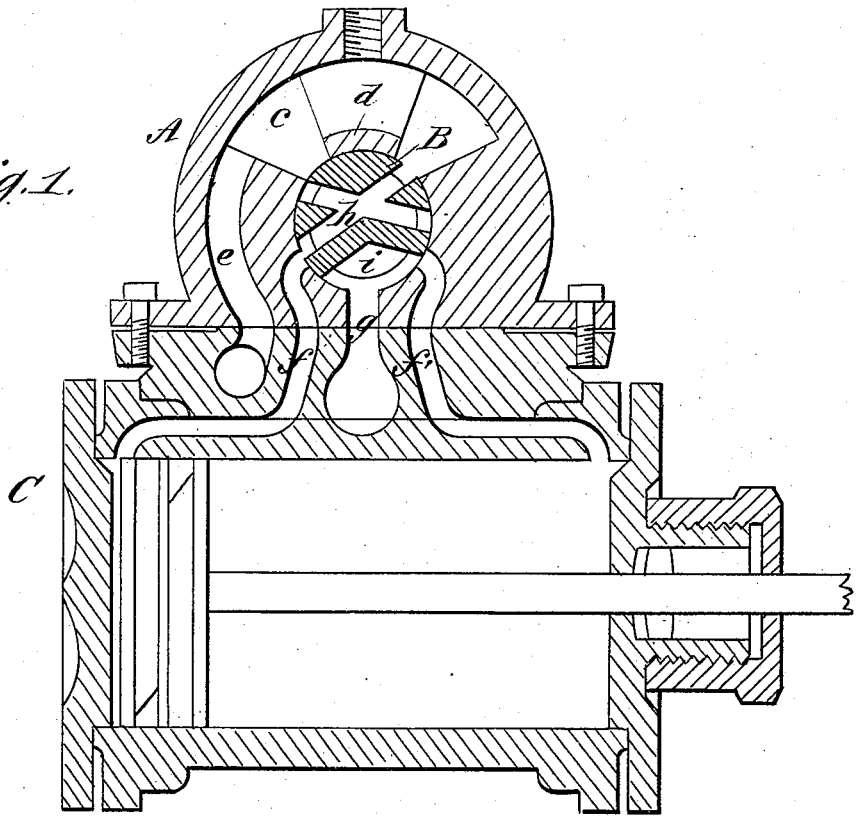
Figure 2:
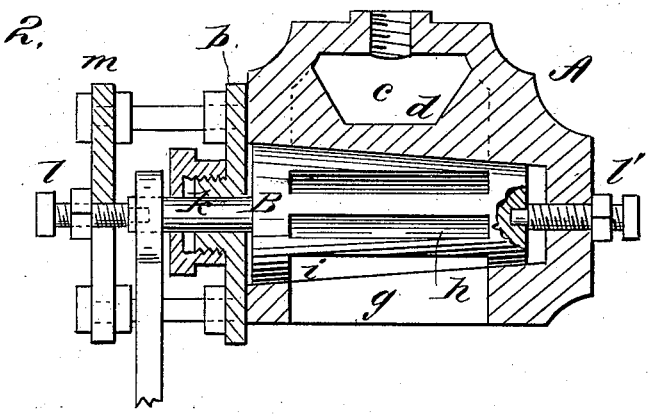

Figure 1 is a longitudinal section of an engine-cylinder, and cross-section of a valve-case and valve of my improved construction applied thereto. Fig. 2 is a longitudinal section of the valve and case.

A is the valve-case, attached upon the engine-cylinder C, and fitted with the rotary valve B. The valve-case is bored out centrally and longitudinally to receive the valve, and is provided with a removable head, $b$, at one end, to allow insertion and removal of the valve.

In the case above the valve is a steam-space, $c$, and a bridge, $d$, at the middle of the steam-space forms a bearing for the upper surface of the valve and a cut-off for the steam.

$e$ is a passage supplying steam to the space $c$. $f f'$ are ports connecting from the valve to the steam-passages of the cylinder, and $g$ is the exhaust-port.

The valve is of tapering or conical form, and is ground to its seat in the case. It is made with transverse slots $h$, extending the length of the ports $f f'$, and placed so as to connect these ports with the steam-space $c$. The valve is also made with an exhaust-cavity, $i$, on its under side. A stem, $k$, is formed or provided upon the large end of the valve, and this stem extends through the head $b$.

To relieve friction, and allow endwise adjustment, the valve is supported at its ends by the pivot-screws $l l'$, the ends of which enter recesses in the ends of the valve; and the screws are made with shoulders that take against the ends of the valve. The screw $l$ is sustained by a yoke, $m$, the screw $l'$ being tapped through the end of the case. The screw-points and the surfaces of the case against which the valve presses should be made of hardened steel.

The valve can be readily adjusted to compensate for wear by loosening the screw $l'$ and tightening the screw $l$, and having a continuous bearing at its ends. The wear will be slight and the operation perfect. In case the valve becomes, by wear, too small to fit tightly, a thimble made with slots corresponding to the ports may be inserted in the case and the valve then turned down to fit the thimble.

Having thus fully described my invention, I claim as new and desire to secure by Letters Patent—

The combination, with the valve having the crossing passages or slots and the exhaust-cavity, of the valve case or chamber having in one side the supply-passage connecting with a chamber in its upper part, and a bridge forming a bearing for the upper surface of the valve, and the cylinder supply and exhaust ports, substantially as and for the purpose set forth.

GEORGE W. SYPHER.

Witnesses:
C. B. McCLUNG,
LUMAN FISK.